Figure 1:
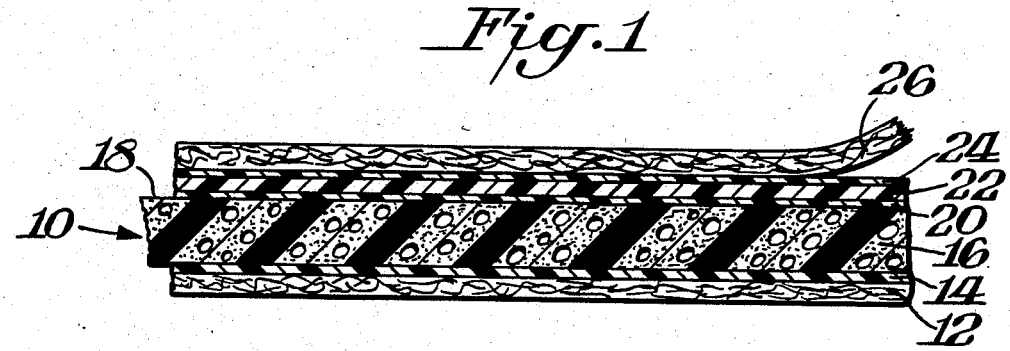

United States Patent [19]

Adelman

[11] Patent Number: 4,584,225
[45] Date of Patent: Apr. 22, 1986

[54] PROTECTIVE MATERIAL AND USE

[75] Inventor: Herbert B. Adelman, Wilmington, Del.

[73] Assignee: The Crowell Corporation, Newport, Del.

[21] Appl. No.: 477,241

[22] Filed: Mar. 21, 1983

Related U.S. Application Data

[63] Continuation-in-part of Ser. No. 348,782, Feb. 16, 1982, abandoned, which is a continuation-in-part of Ser. No. 246,372, Mar. 23, 1981, Pat. No. 4,321,297, which is a continuation-in-part of Ser. No. 166,079, Jul. 7, 1980, Pat. No. 4,263,360.

[30] Foreign Application Priority Data

Mar. 20, 1982 [DE] Fed. Rep. of Germany ....... 3210360

[51] Int. Cl.$^4$ .......................... B32B 1/00; B32B 3/26; C09J 7/02
[52] U.S. Cl. ......................................... 428/71; 428/76; 428/314.8; 428/315.7; 428/315.9; 428/317.3; 428/354; 428/355
[58] Field of Search .................. 428/40, 71, 76, 314.4, 428/314.8, 315.5, 315.7, 317.3, 317.7, 318.4, 315.9, 354, 355

[56] References Cited

U.S. PATENT DOCUMENTS

| | | | |
|---|---|---|---|
| 3,160,549 | 12/1964 | Caldwell et al. | 428/317.3 |
| 3,173,826 | 3/1965 | Campbell et al. | 428/317.3 |
| 3,264,165 | 8/1966 | Stickel | 428/319.1 |
| 3,311,338 | 3/1967 | Culley | 428/40 |
| 3,649,436 | 3/1972 | Buese | 428/317.3 |
| 3,713,925 | 1/1973 | Hartzell et al. | 428/317.3 |
| 3,733,242 | 5/1973 | Davis | 428/317.7 |
| 4,054,204 | 10/1977 | Keeton | 428/71 |
| 4,086,384 | 4/1978 | Adelman et al. | 428/315.5 |
| 4,212,955 | 7/1980 | Tobias et al. | 521/142 |
| 4,232,489 | 11/1980 | Corvington et al. | 428/317.3 |
| 4,301,040 | 11/1981 | Berbeco | 428/317.9 |
| 4,313,987 | 2/1982 | McCormick | 428/40 |

FOREIGN PATENT DOCUMENTS 1362035 4/1964 France ............................. 428/316.6

Primary Examiner—William J. Van Balen
Attorney, Agent, or Firm—Connolly & Hutz

[57] ABSTRACT

Surface such as an airplane fuselage or wing, boat deck, floor or vehicle hood or fender, is protected by a thin foam laminate having a nonabrasive foam face laminated to a sheet of paper or other stiffening support and carrying a stratum of adhesive that adheres to, or reduces the tendency of the laminate to slide, when applied over that surface. Protective laminate can also contain volatile corrosion inhibitor (VCI) which can be incorporated in a cohesive-nonadhesive coating or in a pressure-sensitive adhesive coating. A water-repellent layer can also be applied to the outer surface of the foam laminate. A protective laminate with cohesive-nonadhesive coating can also be made anti-static, and any of the laminates can be strengthened with or made of fibers that make them very difficult to tear. A cushioning sheet having thin foam layers on both faces of a paper support, makes effective packaging for stacking layers of delicate electronic articles or the like, with a cushioning sheet separating adjacent layers.

2 Claims, 3 Drawing Figures

PROTECTIVE MATERIAL AND USE

This application is in part a continuation of prior application Ser. No. 348,782 filed Feb. 16, 1982, (subsequently abandoned) which prior application is a continuation-in-part of earlier application Ser. No. 246,372 filed Mar. 23, 1981 (U.S. Pat. No. 4,321,297 granted Mar. 23, 1982), which in its turn is a continuation-in-part of still earlier application Ser. No. 166,079 filed July 7, 1980 (U.S. Pat. No. 4,263,360 granted Apr. 21, 1981), and the contents of Ser. No. 246,372 are incorporated herein as though fully set forth.

U.S. Pat. No. 4,086,384 describes highly useful laminated packaging sheets in which a layer of pliable closed-cell microcellular foam is adhered to a layer of paper, which may be reinforced by fiberglass strands and/or may have a surface coating of cohesive-nonadhesive. Such material is very effective for interleaving with, or wrapping around, objects to make a package, but may not be sufficiently protective of some objects that are particularly sensitive.

Among the objects of the present invention is the provision of improved laminated sheet material for protecting or packaging materials.

Additional objects of the present invention include improved protective and packaging techniques.

According to the present invention, an important or key surface is protected by foam laminate while work is being done on or near it, or where the surface is being used as a temporary walkway. The laminate has a thin layer of smooth- or nonabrasivefaced resilient foam not over about ⅛ inch thick adhered to a supporting wear-resistant layer less than 1/25 inch, preferably less than 1/50 inch thick, the face of the foam layer that is not adhered to the supporting layer carrying a stratum of frictionincreasing material that reduces the tendency of the laminate to slide along a surface on which that face is placed.

A low-tack pressure-sensitive adhesive is a particularly desirable friction-increasing material to more securely hold a foam laminate against a surface from which it is to be subsequently removed without leaving a residue. Depositing such adhesive from a solvent onto either face of the laminate causes the adhesive to adhere to that face more strongly than to a surface against which the dried adhesive-carrying face is then merely pressed.

According to another aspect of the present invention, a padded sheet of packaging material for objects which are sensitive to electricity, has a layer of paper or other support adhered to one face of a pliable layer of a closed-cell micro-cellular foam, and the foam carries a coating of a cohesive-nonadhesive layer containing anti-static material to inhibit the build-up of static electricity on the sheet.

Any of the foregoing papers may be reinforced with strands of fiberglass to strengthen them. Reinforcement may also be accomplished by adhering other types of mesh such as polypropylene mesh or polyester scrim to the laminate or between the laminae, or the foam-supporting sheet can be a spun-bonded polyolefin or spun-bonded glass fiber sheet or a sheet woven from oriented flat narrow plastic tapes. Such sheets have tremendous resistance to puncturing and tearing. On the other hand, the foam-supporting sheet can be creped or extensible paper to permit the laminate to better follow contours when applied to concave or convex surfaces.

Where the foam, or the supporting sheet, carries a cohesive-nonadhesive surface stratum, such a stratum can show a residual level of adhesion enough to cause such stratum to block and greatly resist unwinding of a roll of such coated laminate. This blocking effect is much more pronounced when the cohesive-nonadhesive stratum is applied to a paper face, as compared with a foam face, and also when the surface against which it is wrapped around is a corona-treated or untreated polyethylene, but can be reduced or eliminated by incorporating an inert powder such as clay in the cohesive-nonadhesive layer. Between about 5 and about 15% clay does a very good job without substantially reducing the aggressiveness of the cohesive action.

Anti-static compositions such as potassium formate or those referred to in Ser. No. 246,372 also have a significant friction-increasing effect when present by themselves on the surface of a resilient micro-cellular closed-cell foam.

Other improved packaging sheets of the present invention contain opaquing material.

Figure 2:
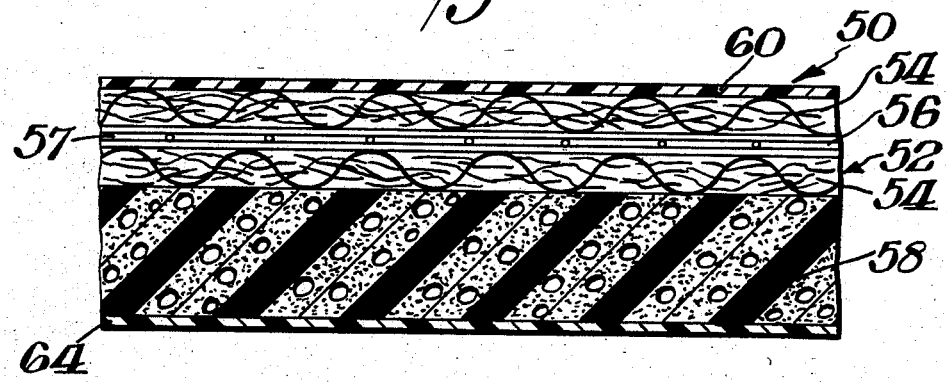
Figure 3:
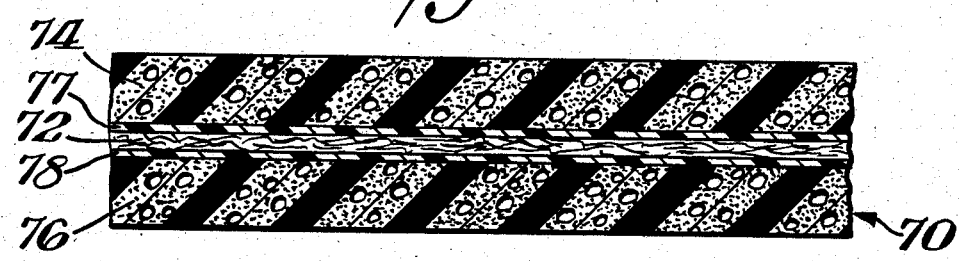

Novel features and advantages of the present invention will become apparent to one skilled in the art from the following description in conjunction with the accompanying drawings in which:

FIG. 1 is a cross-sectional view of a laminated sheet which is one embodiment of this invention; and FIGS. 2 and 3 are cross-sectional views of other laminated sheets which further exemplify the present invention.

The laminated sheet 10 of FIG. 1 has a supporting layer 12 of a wear-resistant paper such as 42 pound kraft linerboard or kraft paper, to which is laminated by amorphous polypropylene or similar laminant 14, a layer of pliable, resilient plastic foam 16 about 3/32 inch thick. The face 18 of the foam has adhered to it by laminant stratum 20 a very thin film 22 that in turn carries a stratum 24 of low-tack pressure-sensitive adhesive. Adhesive stratum 24 is covered by a sheet 26 of release paper which can be waxed or silicone-coated so that it can be readily peeled away from the remainder of the sheet.

Film 22 should not be so stiff as to excessively detract from the resilience of the foam which permits cement stratum 24 to follow minor convexities or concavities of a surface against which the sheet is to be applied. Thus film 22 can be a plastic film not over the 3 to 4 mils thick, or it can be aluminum foil not over about 1 mil thick. Where film 22 is a film of very strong plastic such as polyethylene terephthalate, it can also be as thin as 1 mil or even less.

Film 22 can be entirely omitted, along with adhesive stratum 20, by applying the pressure-sensitive adhesive stratum 24 directly to the face 18 of the foam layer 16. Depositing such low-tack adhesive from solution directly on face 18, causes the low-tack adhesive to adhere very well to face 18, although pressing the dried low-tack face against the surface to be protected, will cause it to not adhere too strongly to that surface. It should take a force of not more than about ½ pound to peel the protective laminate from the key surface that it protects after the laminate has been firmly pressed against that surface. When measured by the rolling ball method described in U.S. Pat. No. 4,104,327 [J. Dow Proc. Inst. Rub. Ind. 1,105], the desired low tackiness is only enough to stop the rolling of a stainless steel ball no larger than about ¼ inch in diameter.

The foam of layer 16 can be of any resilient material as for example a thermoplastic resin foam made from resins such as polyolefins, particularly polypropylene, polyethylene, or polyvinyl chloride, or a polyurethane foam that is not thermoplastic.

The laminates of FIG. 1 can have their release coverings 26 peeled away and the resulting face of cement 24 applied against a surface to be protected from scuffing or similar damage. Thus when constructing or repairing aircraft, it is frequently desirable to walk or place equipment on the wing or fuselage or tail, and this can seriously damage a soft aluminum surface by scratching, particularly where that surface is highly polished. Where the surface to be protected is vulnerable to corrosion, the protecting laminate should have its contacting face free of corrosive agents, and/or the laminate can carry volatile corrosion inhibitors as described in Ser. No. 246,372.

The aircraft surface can be protected by placing the foregoing foam laminate on it, with or without pressing the laminate against that surface. With the low-tack adhesive the laminate will not stick so tenaciously, whether or not pressed in place, that it cannot be completely removed when the protection is no longer needed. The low-tack adhesive will not leave a residue on the protected surface when the laminate is removed. Suitable low-tack adhesives are described in U.S Pat. Nos. 4,165,266, 4,141,319 and 4,104,327.

Similar protection can be applied to a boat deck or house floor when it is being built or repairs are being made, or can be applied over a vehicle hood or fender while working on it.

Where protective laminates are applied to surfaces that are substantially inclined from the horizontal, friction-increasing layer 24 can have a higher degree of tack to help make sure they do not slide down or fall off. In such use the adhesive face can require as much as a pound of pulling force to be pulled away from the surface being protected. However, where there is no such inclination, adhesive 24 can merely be a cohesive-nonadhesive stratum such as the latex layers described in the parent applications. These layers have an increased frictional resistance to sliding on a surface against which the laminates are placed, and in some cases this is enough to hold a protective laminate in place.

The cohesive-nonadhesive layer is, for example, an uncured natural or synthetic rubber latex composition having the property, after it is applied to the laminate and dried, of remaining adhered to the surface on which it is dried, and will thereafter stick to another layer of the same cohesive-nonadhesive type, but will not adhere to other materials such as other layers of the laminate. Uncured natural rubber latex is the preferred latex.

Protective laminates in which the foam is more than about ⅛ inch thick are more expensive and too easily damaged by rough walking. Moreover such laminates in which the paper or other supporting layer is thicker than about 1/25 inch, are too stiff for secure no-slip walking. On the other hand foam thicknesses less than about 1/16 inch are not particularly helpful, and a supporting layer less than about 5 mils thick is too easily punctured. Omission of the supporting layer, as in U.S. Pat. No. 4,313,987 leaves a product that readily tears when it is walked on, particularly where the foam layer is not over ⅛ inch thick.

The friction-increasing effect of layer 24 can also be obtained with coatings that are not considered adhesives. Antistatic coatings such as potassium formate or the surface-active anti-stats described in Ser. No. 246,372, do a good job of increasing friction when applied over closed-cell foam in coating weights as low as 0.1 gram per square meter.

In FIG. 2 is shown a laminated sheet material 50 for packaging or wrapping sensitive material such as solid state circuit boards.

Sheet 50 includes a layer of paper material 52 which has two plies 54, 54 of kraft paper reinforced by strands of fiberglass 56. Kraft paper plies 54 are each, for example, fifty pound kraft paper. Other useful types of kraft paper are, for example, thirty-pound, sixty-pound, or ninety-pound, or even forty-two-pound liner board. Fiberglass strands 56 arranged, for example, in a diamond or square pattern with or without longitudinal strands, are interspersed between paper plies 54 and adhered in place by adhesive 57 which is, for example, of the hot-melt type, such as amorphous polypropylene, and cements the paper plies together.

The paper layers are adhered to a foam layer 58 which is a pliable sealed-cell micro-cellular polymer foam and may, for example, be from about 1/32 inch to ⅛ inch thick. A highly effective sealed-cell micro-cellular polymer foam is the one described in U.S. Pat. No. 4,086,384 as made from polypropylene resin, and constitutes a high-bulk material with approximately fifty thousand closed air cushion cells per cubic inch. Foam polymer layer 58 can be adhered to the paper by the same hot-melt adhesive used to adhere together the kraft paper plies 54, 54. The ultimately laminated sheet 50 has remarkable strength-to-weight ratio and is extremely useful for wrapping and packaging where substantial tear strength is required.

As described in the parent applications, a layer 60 of a water-repellent polymer, such as polyethylene, may be disposed over the top stratum 54 of two-ply kraft paper layer 52, but it is not needed where the packaging sheet and the package made with it are not exposed to liquid water. Polymer coating 60 may be colored or printed to distinguish it and to control the passage of light through it. Other water-repellent polymers, such as polyvinyl chloride, polypropylene, polycarbonates or polyethylene terephthalate can be used in place of the polyethylene, and layer 60 need only be about 25 microns thick.

A suitable anti-static stratum 64 is disposed upon the outer face of the micro-cellular polymer layer 58, as by evaporation of the solvent from a solution of the anti-stat applied over that layer. Alternatively, the polymer of the foam can incorporate anti-static ingredients that impart anti-static properties to the foam.

Where an anti-stat is combined with the cohesive-nonadhesive layer as described in Ser. No. 246,372, it is preferred to use an anti-stat like potassium formate or sodium formate, or the corresponding acetates, or even acetylene black, which is not surface-active. The surface-active anti-stats tend to materially reduce the cementing strength of adhesives. A mixture of 97 to 100 parts natural rubber latex having 50% solids, with 3 to 3½ potassium formate, produces a very effective coating formulation. Applied as a layer that on evaporation leaves a coating weight of 0.6 gram per square meter on a microcellular closed-cell polypropylene foam that had been laminated to a paper sheet, yields a product that has very good cohesive properties and also passes the anti-stat test MIL-B-81705-B. In general the anti-stat concentration can vary from about 0.1 to about 1 gram per square meter, and the cohesive-nonadhesive concentration from about 1 to about 10 grams per square meter. A little glycerol up to an amount equal to that of the anti-stat can also be present in the anti-stat coating or in the combined anti-stat cohesive-nonadhesive coating.

As explained in Ser. No. 246,372, water-soluble anti-stats are preferably deposited from water solution, and waterinsoluble ones from solution in a solvent like methanol. The uncured rubbers for the cohesive-nonadhesive cement can also be applied from solution.

Anti-stat coatings, including such coatings that are also cohesive-nonadhesive, generally undergo reduction of anti-stat effectiveness when aged over a long period of time. Although U.S. Pat. No. 3,658,744 indicates (bottom of its column 8) that the anti-stat can cause instability in a latex, the combinations of anti-stat with cohesive-nonadhesives in accordance with the present invention show gradual diminution in both anti-stat effectiveness, as well as cohesiveness, over several months. Such diminution is slowed by shielding the coatings against light, particularly actinic light, and also by covering the coatings to keep air from them. The laminated products so coated are accordingly best tightly wrapped with opaque paper or the like when they are stored and shipped. Thus a roll or stack of the laminated sheeting can be so wrapped. Where an anti-stat is very dark in color, acetylene black for example, protection against light is not so important.

The foregoing stability factors are of key significance. It is believed in this connection that there has in the past been some advertising offering for sale paper-foam wrapping laminates in which the exposed foam surface is rendered anti-static as well as cohesive-nonadhesive, but so far as can be determined no acceptable product has previously been delivered pursuant to such advertising, and the advertising itself appears to have been discontinued.

The water barrier 60 can be omitted from FIG. 2 or replaced by aluminum foil or polyester film, and such foil or film can if desired be laminated between the foam and the paper. Aluminum foil is a vapor and/or light barrier to also help protect sensitive materials such as light-sensitive photographic films. An aluminum foil 0.0008 inch thick is very effective for this purpose. The aluminum foil can also enhance the protective effect by providing an electrostatic barrier that shields against the effect of external static electricity.

For example, a paper backing of 30 pound kraft when laminated with 0.0008 inch aluminum foil and 1/16 inch micro-cellular closed-cell foam, and tested in accordance with Federal Standard 101-B, Method 3030, Procedure B, showed an MVTR (moisture vapor transmission rate) of 0.02 g/100 in.$^2$/24 hr. With this value, the product fully complies with the moisture vapor transmission requirements of Military Specification MIL B-131-F. Its puncture resistance is also greater than a corresponding packaging sheet that did not include the foil layer.

The packaging sheets of this invention have excellent versatility and performance, particularly for the special problems of packaging material sensitive to corrosivity, static electricity, light, abrasion, etc. The micro-cellular polyolefins in such laminates comply with F.D.A. regulations which permit them to be safely used as an article or a component of an article in contact with food. They are unaffected by exposure to grease, water and most acids, bases and solvents. They stay flexible within a wide temperature range, have neutral pH, are non-toxic, non-corrosive, lint-free, have excellent abrasion resistance and will not support the growth of mildew or fungus. They also have an excellent clean whitish appearance which is highly desirable for the packaging of many materials. Polyethylene foam is not as desirable as polypropylene foam inasmuch as polyethylene is difficult to adhere to other laminants.

Some foam-supporting sheets such as spun-bonded polypropylene sheets can be adversely affected by molten adhesives, and polyester cements or epoxy cement or the oil-resistant cements of Ser. No. 246,372 can be used for securing the foam to such sheets.

Where a layer of volatile corrosion inhibitors is applied to a laminate of the present invention, it can be applied as a surface coating by itself or mixed with the natural rubber latex of a cohesive-nonadhesive formulation and/or with anti-stat.

Ordinary kraft paper when used in weights as high as 90 pounds or even higher per ream, is not perfectly opaque. For use in packaging light-sensitive material such as unexposed microfiche film, a single opaque paper ply laminated to the micro-cellular closed-cell foam can be used, as for example when the paper is a fifty-pound sheet beater-dyed with Basic Violet No. 3 or Pigment Black No. 7, to a dye content of about ½% by weight. Where two paper plies are present in the laminated assembly, either one, or both can be dyed, and when both are dyed their dye content can be lower and as little as ¼% by weight. However thinner sheets should contain proportionately more dye. Carbon black can also be incorporated in the papers instead of or together with one or more dyes.

Aluminum foil that is extremely thin, e.g. 0.3 to 0.8 mil, is also opaque and can be laminated in an assembly of kraft paper and foam, but such thin foil usually contains pin-holes that admit light even when they are filled with adhesive. It is accordingly best not to rely on such thin foils for the most light-sensitive of articles. Carbon black can likewise be incorporated in the foam, as by foaming carbon-loaded resin, and will impart anti-static properties in addition to opaqueness, particularly if the carbon black is acetylene black.

For wrapping light-sensitive material, the opaque wrapping sheet preferably carries the cohesive-nonadhesive coating, but does not need the VCI unless the light-sensitive material is packaged with corrodible metal. The cohesive-non-adhesive coating, or the foam surface under it, can also contain the anti-static agent.

The wrapping sheets of the present invention can be used for any wrapping or interleaving application. The cohesive-non-adhesive layer makes these sheets particularly desirable inasmuch as such sheets are readily secured to each other without the need for supplementary closure materials such as tape, staples or other fasteners, glue, heat sealing or twine. Examples of such use are given in Ser. No. 246,372.

While paper sheets are quite suitable for the foam-supporting plies such as 54, 54, these plies can be made of interwoven or knitted textile fibers, or of air-felted textile fibers, or even of plastic film. A strong plastic such as polyethylene terephthalate or polypropylene is preferred for such film or for the fibers. Instead of the usual types of plastic fibers, narrow widths of plastic film can be inter-woven to make one or both of the plies. When a ply is made of strong material such as the polyethylene terephthalate, it makes a very effective reinforcement for a paper ply whether such reinforcement be an outer layer of the packaging sheet or a layer between the foam layer and the adjacent ply. Having a relatively smooth surface on one face of the packaging sheet is desirable because such a surface can be printed with advertising or the like.

The use of even two paper plies without any reinforcement is not as desirable as having one ply of paper together with a high-strength reinforcement. Glass fibers or nylon or qiana fibers are very effective and glass is particularly desirable by reason of its low cost and its minimal elongation properties. An un-reinforced paper-foam packing sheet is only suitable for very light duty packaging use, whereas a well-reinforced packing sheet is very difficult to tear. This is of major importance when packaging items which are likely to puncture or tear the packaging material, and in the event of a puncture, the sheet will generally not tear beyond the nearest reinforcing fiber.

FIG. 3 shows a packaging sheet 70 having a support stratum 72 sandwiched between two foam layers 74, 76 to which it is laminated by adhesive layers 77, 78. This type of sheet in which stratum 72 is not over about 1/25 inch thick and each foam layer is not more than about ⅛ inch thick, is particularly desirable for packaging delicate articles. A packaging container can thus have a sheet 70 placed on its floor, a layer of delicate electronic parts placed on that sheet, another sheet 70 placed over that layer, a second layer of electronic parts placed on the second sheet, and the layering thus built up to any desired height. The sheets 70 not only cushion the parts in one layer with respect to the parts in adjacent layers, but their foam faces help keep the parts in any layer from damaging contact with adjacent parts in the same layer. A cohesive-nonadhesive surface coating on the foam is not really needed to help prevent the latter type of damage, but can be used if desired.

It will be noted that as defined herein, the cohesive-nonadhesive layers have essentially no tack and cannot be considered pressure sensitive adhesive cements all of which have substantial tack.

The thickness of the adhesive layer is distorted in some of the figures and shown much greater than actual thickness. Such actual thickness is generally about 1 to 2 mils, and when the adhesive is applied to paper and/or foam, it tends to sink into the pores of the paper and the irregularities in the surface of the foam so that its measured thickness can be less.

Obviously many modifications and variations of the present invention are possible in the light of the above teachings. It is, therefore, to be understood that within the scope of the appended claims the invention may be practiced otherwise than as specifically described.

What is claimed:

1. A package of laminated sheeting in which the sheeting has a paper layer laminated to a layer not over about ⅛ inch thick of pliable closed-cell microcellular resin foam, the foam having its outer surface coated with a cohesive-nonadhesive layer containing sufficient anti-static material to inhibit the build-up of static electricity on the sheet, the package having the sheeting tightly wrapped in an opaque wrapper.

2. A laminated protective sheeting having a paper layer, a layer not over ⅛ inch thick of pliable closed-cell micro-cellular resin foam, adhesive material securely bonding the micro-cellular foam layer to the paper layer, and the foam having its outer surface coated with a cohesive-nonadhesive layer containing sufficient potassium formate to inhibit the build-up of static electricity on the sheet.

* * * * *